United States Patent
Lange

(10) Patent No.: US 10,720,814 B2
(45) Date of Patent: Jul. 21, 2020

(54) ELECTRICAL MACHINE AND METHOD FOR COOLING THE ELECTRICAL MACHINE

(71) Applicant: Siemens Aktiengesellschaft, Munich (DE)

(72) Inventor: Thomas Lange, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 15/736,684

(22) PCT Filed: Apr. 28, 2016

(86) PCT No.: PCT/EP2016/059523
§ 371 (c)(1),
(2) Date: Dec. 14, 2017

(87) PCT Pub. No.: WO2016/202492
PCT Pub. Date: Dec. 22, 2016

(65) Prior Publication Data
US 2018/0183301 A1    Jun. 28, 2018

(30) Foreign Application Priority Data

Jun. 16, 2015 (DE) .................. 10 2015 211 048

(51) Int. Cl.
*H02K 1/32* (2006.01)
*H02K 9/22* (2006.01)
(Continued)

(52) U.S. Cl.
CPC .................. *H02K 9/22* (2013.01); *H02K 5/18* (2013.01); *H02K 5/20* (2013.01); *H02K 9/04* (2013.01); *H02K 9/18* (2013.01); *H02K 9/19* (2013.01)

(58) Field of Classification Search
CPC .. H02K 9/19; H02K 5/20; H02K 9/04; H02K 9/22; H02K 5/18; H02K 9/14; H02K 9/18; H02K 9/16
(Continued)

(56) References Cited

U.S. PATENT DOCUMENTS 2,536,815 A * 1/1951 Koch ................. H02K 9/14
                                                    310/57
2,662,195 A * 12/1953 Fisher .................. H02K 9/19
                                                    310/59

(Continued)

FOREIGN PATENT DOCUMENTS

DE      1613307    9/1970
DE      2836903    2/1980
(Continued)

OTHER PUBLICATIONS

PCT International Search Report and Written Opinion of International Searching Authority dated Jul. 9, 2017 corresponding to PCT International Application No. PCT/EP2016/059523 filed Apr. 28, 2016.

*Primary Examiner* — Thanh Lam
(74) *Attorney, Agent, or Firm* — Cozen O'Connor

(57) ABSTRACT

A method and electrical machine includes a housing and a tube within a channel, wherein a first coolant can flow around the tube and a second coolant can flow through the tube, whereby in order to cool the electrical machine, the first coolant is conducted in a coolant circuit within the electrical machine, the second coolant is conducted through the electrical machine, and the first coolant medium is conducted through a rotor of the electrical machine such that a compact and efficient cooling of the electrical machine becomes possible.

16 Claims, 4 Drawing Sheets

(51) Int. Cl.
*H02K 5/18* (2006.01)
*H02K 5/20* (2006.01)
*H02K 9/18* (2006.01)
*H02K 9/04* (2006.01)
*H02K 9/19* (2006.01)

(58) Field of Classification Search
USPC .............................................. 310/52–59, 64
See application file for complete search history.

(56) References Cited

U.S. PATENT DOCUMENTS

| | | | | |
|---|---|---|---|---|
| 2,707,243 A * | 4/1955 | Baudry | ............... | H02K 9/18 |
| | | | | 310/57 |
| 3,461,328 A | 8/1969 | Drouard | | |
| 3,505,546 A * | 4/1970 | Willyoung | ............... | H02K 9/18 |
| | | | | 310/55 |
| 5,925,947 A * | 7/1999 | Kajiwara | ............... | H02K 9/18 |
| | | | | 310/58 |
| 7,102,267 B2 * | 9/2006 | Gromoll | ............... | H02K 9/14 |
| | | | | 310/260 |
| 2011/0278969 A1 * | 11/2011 | Memminger | ............ | H02K 9/10 |
| | | | | 310/59 |
| 2013/0257197 A1 * | 10/2013 | Buttner | ............... | H02K 9/08 |
| | | | | 310/54 |
| 2014/0042841 A1 * | 2/2014 | Rippel | ............... | H02K 1/20 |
| | | | | 310/54 |
| 2014/0117797 A1 | 5/2014 | Grillenberger et al. | | |
| 2016/0204680 A1 | 7/2016 | Noack et al. | | |

FOREIGN PATENT DOCUMENTS

| | | |
|---|---|---|
| DE | 272588 | 10/1989 |
| DE | 19716758 | 10/1998 |
| DE | 102013210559 | 12/2014 |
| EP | 2741397 | 6/2014 |
| FR | 1349625 | 1/1964 |
| FR | 2835109 | 7/2003 |
| GB | 516161 | 12/1939 |
| GB | 782200 | 9/1957 |
| GB | 903351 | 8/1962 |
| RU | 2510560 C2 | 3/2014 |
| WO | WO2012159660 | 11/2012 |

* cited by examiner

ELECTRICAL MACHINE AND METHOD FOR COOLING THE ELECTRICAL MACHINE

CROSS-REFERENCE TO RELATED APPLICATIONS

This is a U.S. national stage of application No. PCT/EP2016/059523 filed 28 Apr. 2016 and claims the priority of German application No. DE102015211048 filed Jun. 16, 2015, the content of which is incorporated herein by reference in its entirety.

BACKGROUND OF THE INVENTION

1. Field of the Invention

The invention relates to an electrical machine and a method for cooling thereof.

2. Description of the Related Art

Electrical machines, particularly dynamoelectric machines, such as an electrical motor or an electrical generator, are cooled to increase efficiency in order to dissipate waste heat.

U.S. Pat. No. 2,536,815 discloses a machine comprising a frame spaced apart from the stator lamination stack, where a cooling tube is conducted in the resulting space.

DE 28 36 903 A1 discloses an enclosed electrical machine with pipe cooling, the stator of which is surrounded with clearance by a sheet metal casing, which is in turn tightly connected to support rings for support shields supported by the stators and the support rings are permanently connected in a sealing manner to cooling pipes arranged around the stator symmetrically to the longitudinal axis at holes. In this manner, an enclosed inner space is produced in which, in a part of its circuit, the inner cooling air flows over the stators between the cooling pipes through which outer air flows, where the support rings are held exclusively by cooling pipes and these cooling pipes are held in close thermal contact with the stator.

GB 516,161 A discloses a dynamo-electric machine comprising a fan, where internal hot air is circulated through lateral tubes and cool ambient air is passed over the tubes and the stator.

U.S. Pat. No. 3,461,328 A discloses a rotary electrical machine that includes prismatic supports on its external side. Passages for cooling air are formed by subdivisions in the supports.

SUMMARY OF THE INVENTION

It is an object of the invention to improve the cooling of an electrical machine.

This and other objects and advantages are achieved in accordance with the invention by an electrical machine and a method for cooling the electrical machine, where the electrical machine comprises a housing and has a tube. The tube is in a channel, where a first coolant can flow round the tube and a second coolant can flow through the tube. As a result, the tube can be in contact with two distinctly separate coolants. Herein, at least one of the coolants or even both coolants can, for example, be assigned to one coolant circuit or a plurality of different coolant circuits. A coolant can, for example, also be ambient air, which can be drawn in and transported away when heated.

The internal air in an electrical machine can also be supplied by air ducts located in the airflow of surface cooling for the machine. Cooling then occurs via the walls of the air ducts. Decisive factors for cooling of this kind are the surfaces and wall thicknesses involved in the heat transfer.

The integration of a tube or a plurality of tubes in the electrical machine enables the exchange of thermal energy between the coolants to be improved. The integration of one or more tubes, particularly thin-walled tubes, within an internal air duct of the electrical machine enables the first coolant to flow around the tube or tubes and the second coolant to flow through the tube or tubes.

Sealing the tubes with respect to walls of the internal air duct or the plurality of internal air ducts enables a degree of protection of the electrical machine to be retained. Heat transfer for cooling the internal air of the electrical machine can occur through the tubes or also via the walls thereof.

In one embodiment of the electrical machine, the length of the tube is equal to or greater than the length of a stator lamination or the stator lamination of the electrical machine. The longer the tube, the larger the surface that can be provided for the heat transfer process.

The tube provided for the heat transfer process can have different cross sections. This tube can have a circular, oval and/or angular cross section.

In one embodiment of the electrical machine, the length of the channel is equal to or greater than the length of the stator lamination. The length of the channel and the lengths of the tubes are in particular matched to one another. In one embodiment, the tubes are longer than the channel.

In another embodiment of the electrical machine, the channel comprises a first opening in the region of a first end face of the electrical machine and a second opening in the region of a second end face of the electrical machine. Consequently, in the region of the end faces of the electrical machine, a coolant can enter the channel and exit again at the opposite end face.

In a further embodiment of the electrical machine, the housing comprises cooling fins disposed in the circumferential direction, where in particular the channel is between cooling fins. Cooling fins enable the cooling of the electrical machine to be additionally improved. Arranging the channel between cooling fins can provide a compact design.

In yet another embodiment of the electrical machine, a bypass is provided to conduct the first coolant. The bypass enables different channels in the region of an end face of the stator lamination to be connected to one another.

In an embodiment of the electrical machine, a channel wall of the channel is an outer wall of the electrical machine. This, for example, enables cooling efficiency to be increased. However, it also possible to achieve a compact design of the electrical machine in this way.

In another embodiment of the electrical machine, the machine comprises a supporting foot or a plurality of standing feet. Herein, at least one supporting foot is formed such that the channel is between the supporting foot and the stator lamination stack. This has the result that the electrical machine has a compact design and the coolant circuit for the coolant in the channel does not remain small.

In another embodiment of the electrical machine, the channel comprises a support structure to absorb the weight force of the stator and to introduce this weight force into the supporting foot. Thus, the channel can fulfill different functions and, in addition to conducting a coolant, at least partially accommodate the tubes and provide structural stability for the electrical machine.

In a further embodiment of the electrical machine, the channel is closed at the end face, where the tube or the tubes penetrate the channel at the end face.

The electrical machine can comprise one or more channels with tubes. If the channels are located in the region of the standing feet of the electrical machine, the machine in particular comprises two channels with tubes.

In another embodiment of the electrical machine, the channel has a variable axial length, where in particular the axial length increases in a direction toward the stator. This enables the channel to open toward the end faces of the stator lamination.

In yet another embodiment of the electrical machine, a plurality of tubes are provided in the channel. This enables the surface for heat transfer in the channel between the coolants to be kept large.

In a still further embodiment of the electrical machine, the machine comprises at least two channels in an attachment region of the electrical machine. As a result, there is no need for the unfavorable displacement of the center of gravity of the electrical machine.

In accordance with the method for cooling the electrical machine, a first coolant (for example, a gas such as air, or a liquid such as water) is conducted in a coolant circuit within the electrical machine, where a second coolant (for example, a gas such as air, or a liquid such as water) is conducted through the electrical machine, where the first coolant is in particular conducted through a rotor and/or a stator of the electrical machine.

For the method, an electrical machine can be used in one of the above-described embodiments or in an embodiment as described below.

The described embodiments of the electrical machine or the described methods enable improved cooling of the electrical machine to be achieved. Decisive factors for effective cooling are in particular the surfaces and wall thicknesses involved in the heat transfer. Thus, in particular, integration of one or more thin-walled tubes, for example, in the internal air duct of the electrical machine can improve the cooling. A coolant flows through the tubes. Sealing the tubes with respect to the walls of the internal air duct enables the degree of protection of the machine to be retained. Thus, the heat transfer for cooling the internal air also occurs via the walls of the tubes. Conducting the coolant through the internal air duct results in a hybrid concept due to a combination of tube cooling and surface cooling. The surface cooling occurs, for example, via cooling fins on the housing of the electrical machine.

This cooling concept enables various advantages to be achieved individually or in combination. For example, it is possible to achieve a significant increase in the heat dissipation without additional cooler units or cooling modules. Possibilities for optimizing the cooling can also be achieved by varying the size, shape and number of cooling channels or cooling tubes.

This enables not only the achievement of cost benefits (€/kW), but also a better material utilization (in particular for the active part, i.e., in the case of an asynchronous machine, the stator). It is possible to achieve a larger cooling surface without requiring additional space or a reduction in the amount of material used per cooling surface. This can result in higher machine efficiency. To improve cooling performance, the electrical machine can comprise an internal fan and/or an external fan. The fan or fans are integral fans and/or separately driven fans.

In an embodiment of the method for cooling the electrical machine, flow through the tube or tubes occurs in the same direction as the flow round the tube or tubes. The opposite direction is also possible. In this embodiment of the method, the flow through the tube then occurs in the opposite direction to the flow round the tube.

In another embodiment of the method for cooling the electrical machine, the flow through the tube or tubes occurs in the opposite direction to the flow round said tube or tubes.

In a further embodiment of the method for cooling the electrical machine, a gaseous coolant is used as the first coolant, where a gaseous or a liquid coolant is used as the second coolant, and where in particular the stator is predominantly cooled by cooling fins. The rotor is then predominantly cooled via the tubes through which and around which the flow passes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes the invention by way of example with reference to figures, in which.

DETAILED DESCRIPTION OF THE EXEMPLARY EMBODIMENTS

Figure 1:
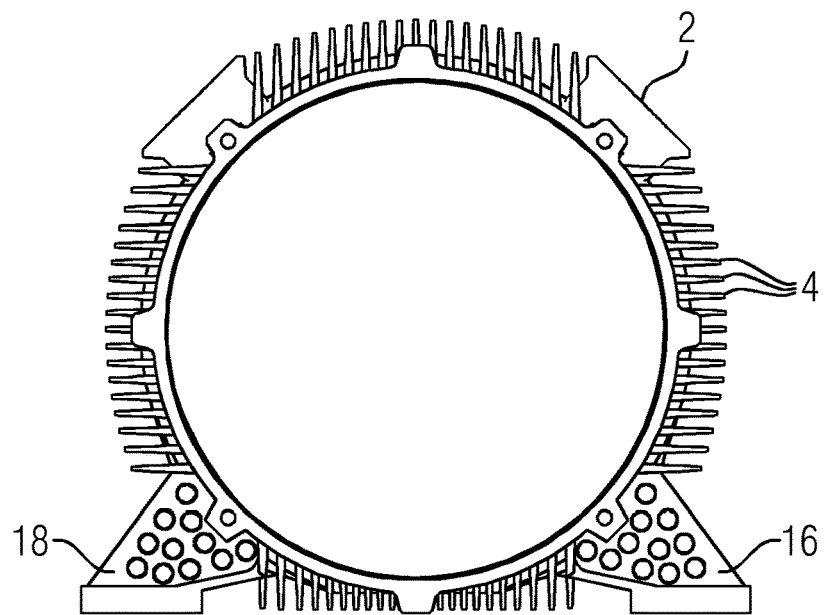
FIG. 1 is a cross-sectional view of a housing of an electrical machine in accordance with the invention.

The depiction in FIG. 1 shows a cross section of a housing 2 of an electrical machine, where the housing 2 comprises cooling fins 4 and standing feet 16 and 18. The standing feet 16 and 18 have a plurality of holes through which tubes for a cooling system can be introduced. The tubes, which are, for example, depicted in FIG. 2, form a tight seal with the holes. In addition to their function to date of securing the electrical machine, the standing feet now have a further function, namely supporting the tubes (cooling tubes) for cooling the electrical machine and/or closing or bounding a channel (cooling channel).

Figure 2:
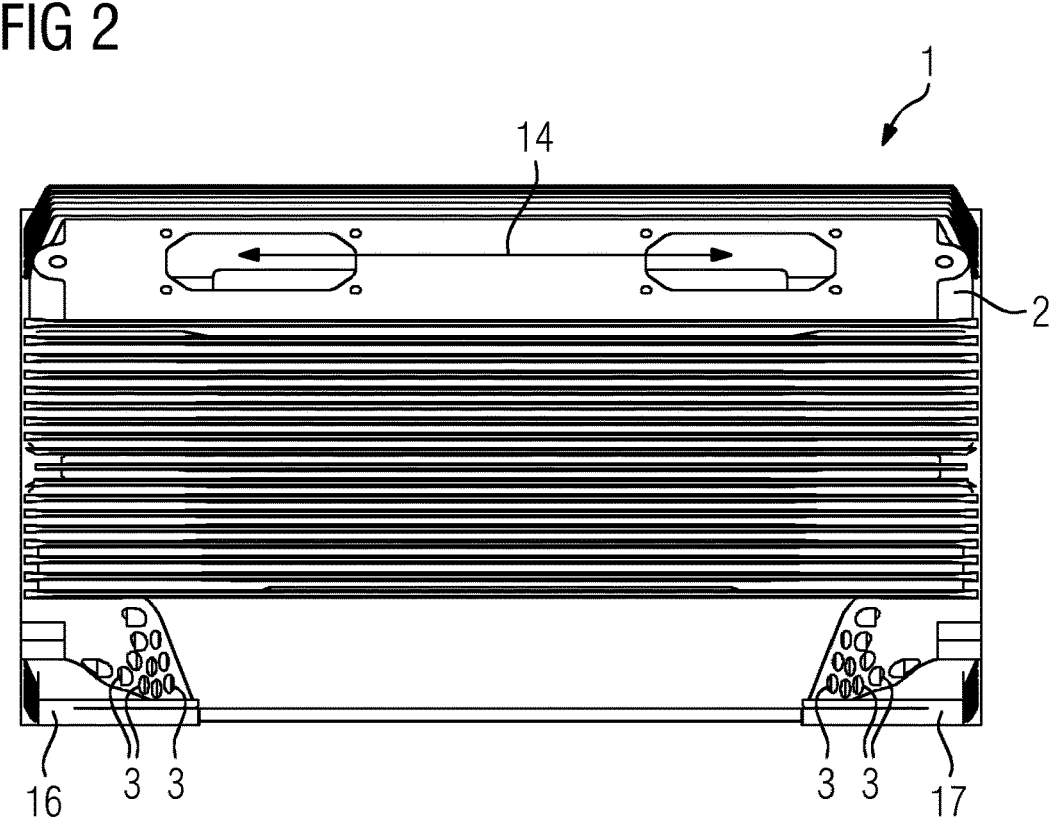
FIG. 2 is a side view of a housing of an electrical machine in accordance with the invention.

The depiction in FIG. 2 shows a side view of a housing 2 of an electrical machine 1. The tubes 3 emerging from the standing feet 16 and 17 are shown in the region of the standing feet 16 and 17 the electrical machine 1. The tubes 3 are provided to ensure that a first coolant flows around them within the electrical machine and they are supplied from outside with a second coolant so that this second coolant flows through the tubes. A bypass 14 is provided within the electrical machine 1 by which the first coolant can communicate between the end faces of the electrical machine 1.

Figure 3:
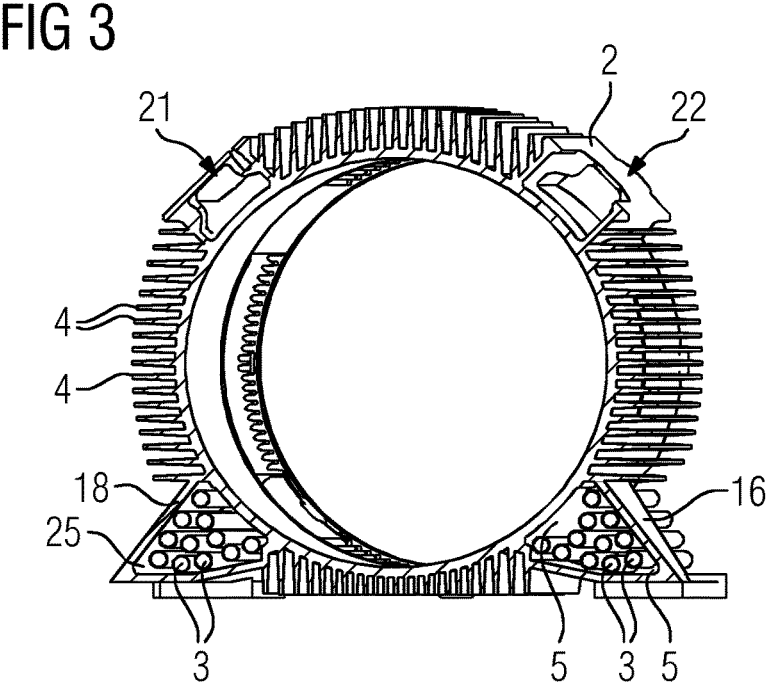
FIG. 3 is a perspective cross-sectional view of a housing of an electrical machine in accordance with the invention.

The depiction in FIG. 3 shows a perspective cross section of the housing 2 of the electrical machine 1. Here, the tubes 3 are conducted in channels 5 and 25. The channel 5 ends or starts in the region of the supporting foot 16. The channel 25 ends or begins in the region of the supporting foot 18. The tubes are conducted in the channels 5, 25. When the electrical machine is in operation, the first coolant flows through the length of the tubes 3. A terminal box can be connected via terminal holes 21 and 22. It is also possible to provide cable bushings or introduce cabling via the terminal holes 21 and 22.

Figure 4:
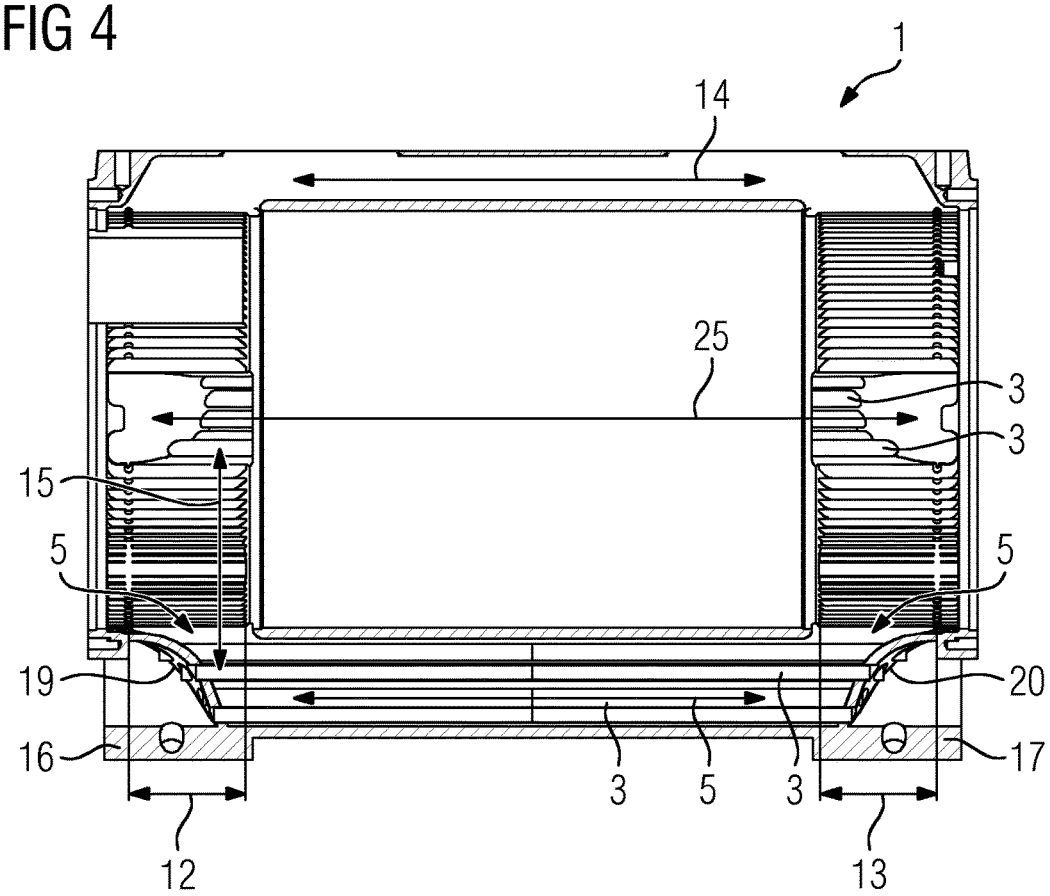
FIG. 4 is a longitudinal sectional view of a housing of an electrical machine in accordance with the invention

The depiction in FIG. 4 shows the housing 2 of the electrical machine 1 in a longitudinal section. This shows the two channels 5 and 25 into which the tubes 3 project. The channels 5 and 25 are open in the region of the end faces of a stator lamination stack or in the region of winding overhangs (both shown in FIG. 5). The first coolant can also be conducted in the axial direction via the bypass 14 in a region of the electrical machine opposite the standing feet. In the region of an end face of the stator lamination stack, the coolant can be conducted via a bypass 15 from a supporting-foot region to the opposite supporting-foot region on the same end face. The channel 5 has a first opening 12 in the region of the supporting foot 16. The opening 12 is directed toward the end face of the electrical machine. Therefore, the channel 5 is open toward a region which, for example, comprises a winding overhang of the electrical machine. The channel 5 also has a second opening 13 in the region of the supporting foot 17. The opening 13 is also directed toward the end face of the electrical machine. Therefore, here, the channel 5 is also open toward a region which for example comprises a winding overhang of the electrical machine. Like the channel 25, which is not shown here, the channel 5, comprises a stopper 19 in an end-face region of the electrical machine in the region of the supporting foot 16. The tubes 3 pass through the stopper 19 of the channel 5. In the region of the supporting foot 17, the channel 5 comprises an end-face stopper 20 through which the tubes 3 pass.

Figure 5:
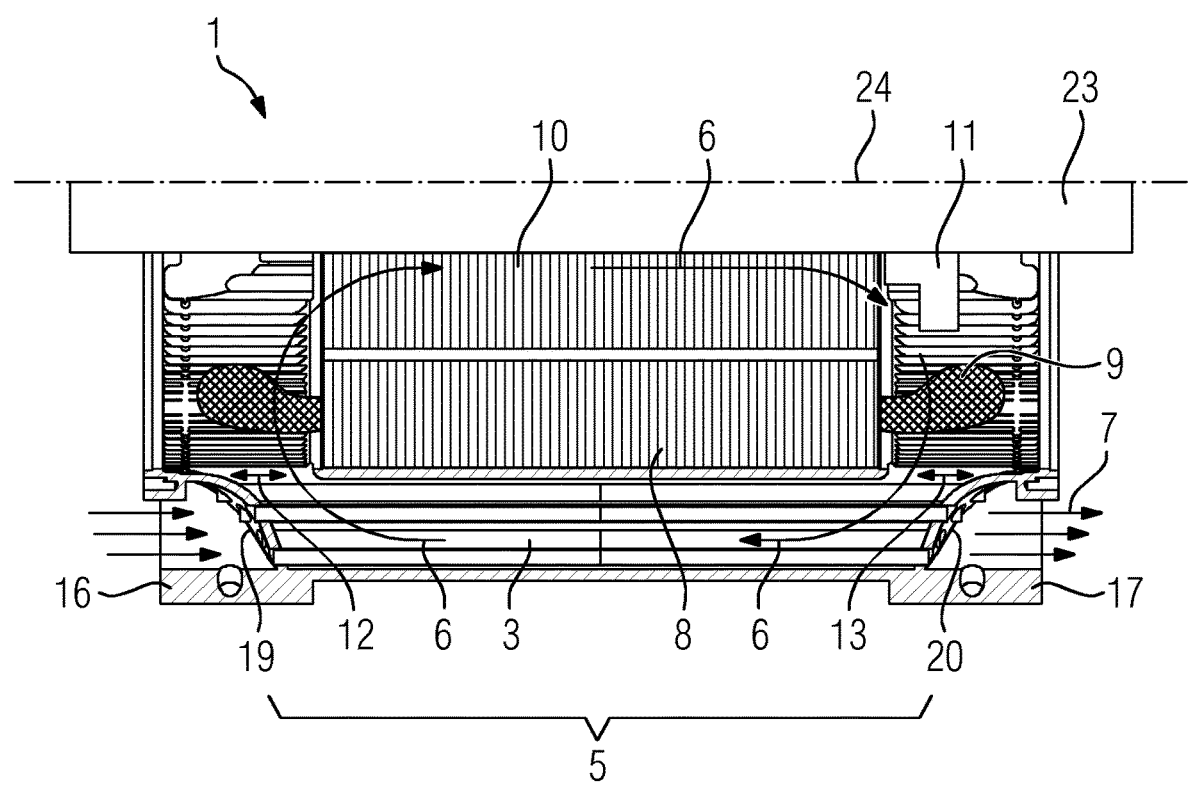
FIG. 5 is a cross-sectional view through an electrical machine.

The depiction in FIG. 5 shows a further aspect of the electrical machine 1. FIG. 5 shows a cross-sectional view through the electrical machine 1, where in addition to a shaft 23 with an axis 24, there is also a schematic depiction of a rotor lamination stack 10 and a stator lamination stack 8. In the present example, the rotor of the electrical machine 1 comprises a fan 11 at the end face. The stator of the electrical machine comprises end-face winding overhangs 9 and 26. The first coolant 6 is conducted via these winding overhangs 9 and 26 in a coolant circuit 6, where the coolant is conducted via the channel 5 from one end face of the electrical machine to the opposite end face. The channel 5 contains the tubes 3, around which the first coolant 6 flows and through which the second coolant 7 flows. The first coolant 6 gives off thermal energy to the second coolant 7 via the tubes 3. The first coolant 6 is, for example, gaseous and the second coolant 7 is, for example, a liquid. The first and the second coolant 6, 7 separate from one another and do not mix.

Figure 6:
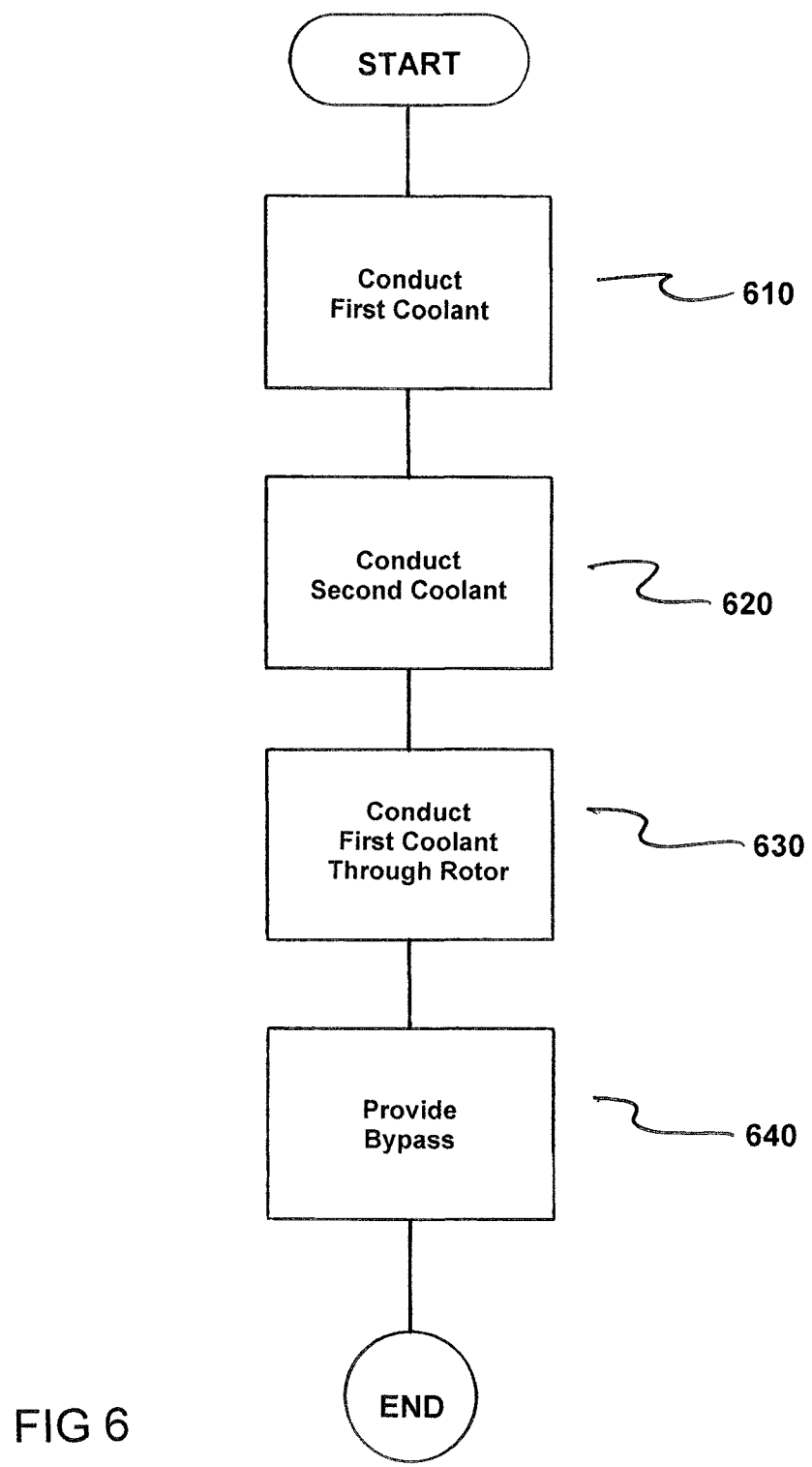
FIG. 6 is a flowchart of the method in accordance with the invention.

FIG. 6 is a flowchart of a method for cooling an electrical machine 1. The method comprises conducting a first coolant 6 in a coolant circuit within the electrical machine 1, as indicated in step 610.

Next, a second coolant 7 is conducted through the electrical machine, as indicated in step 620.

The first coolant 6 is now conducted through a rotor 3 of the electrical machine 1, as indicated in step 630.

Next, a bypass 14 is provided within the electrical machine via which the first coolant communicates between end faces of the electrical machine 1, as indicated in step 640.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical machine comprising:
   a housing;
   a tube disposed in a channel, a first coolant flowing around the tube and a second coolant flowing through said tube; and
   a bypass for conducting the first coolant;
   wherein the channel comprises a support structure which absorbs a weight force of a stator and which introduces this weight force into a supporting foot of the electrical machine.

2. The electrical machine as claimed in claim 1, wherein a length of the tube is equal to or greater than a length of a lamination of the stator.

3. The electrical machine as claimed in claim 1, wherein a length of the channel is equal to or greater than the length of a lamination of the stator.

4. The electrical machine as claimed in claim 2, wherein a length of the channel is equal to or greater than the length of the stator lamination.

5. The electrical machine as claimed in claim 1, wherein the channel includes a first opening in one of (i) a region of a first end face of the electrical machine and (ii) the stator of the electrical machine, and includes a second opening in a region of one of (i) a second end face of the electrical machine and (ii) the stator of the electrical machine.

6. The electrical machine as claimed in claim 1, wherein the housing comprises cooling fins disposed in a circumferential direction; and wherein the channel is arranged between the cooling fins.

7. The electrical machine as claimed in claim 1, wherein a channel wall of the channel is an outer wall of the electrical machine.

8. The electrical machine as claimed in claim 1, wherein the channel is at least partially disposed between the supporting foot and the stator lamination stack.

9. The electrical machine as claimed in claim 1, wherein the channel is closed at an end face; and wherein the tube penetrates the channel at the end face.

10. The electrical machine as claimed in claim 1, wherein the channel has a variable axial length; and wherein the axial length increases in a direction toward the stator.

11. The electrical machine as claimed in claim 1, wherein a plurality of tubes are provided in the channel.

12. The electrical machine as claimed in claim 1, wherein at least two channels are provided in an attachment region of the electrical machine (s).

13. A method for cooling an electrical machine, comprising:
- conducting a first coolant in a coolant circuit within the electrical machine said electrical machine comprising a housing, a tube disposed in a channel and a bypass for conducting the first coolant;
- conducting a second coolant through the tube of the electrical machine;
- conducting the first coolant around the tube and through a rotor of the electrical machine; and
- providing communication of the first coolant between end faces of the electrical machine via the bypass within the electrical machine;

wherein the channel comprises a support structure which absorbs a weight force of a stator and which introduces this weight force into a supporting foot of the electrical machine.

14. The method as claimed in claim 13, wherein one of (i) the first coolant flow through the tube occurs in the same direction as a coolant flow around said tube and (ii) the first coolant flow through the tube occurs in a direction opposite to the coolant flow around said tube.

15. The method as claimed in claim 13, wherein the first coolant comprises a gaseous coolant; wherein the second coolant comprises a gaseous or liquid coolant; and wherein the stator is predominantly cooled by cooling fins.

16. The method as claimed in claim 14, wherein the first coolant comprises a gaseous coolant; wherein the second coolant comprises a gaseous or liquid coolant; and wherein the stator is predominantly cooled by cooling fins.

* * * * *